(No Model.)

N. BOTSFORD.
MACHINE FOR GATHERING STONES.

No. 349,685. Patented Sept. 28, 1886.

Attest.
R. F. Osgood
Mary McDermott

Inventor:
Nathan Botsford

N. PETERS, Photo-Lithographer, Washington, D. C.

UNITED STATES PATENT OFFICE.

NATHAN BOTSFORD, OF LOCKPORT, NEW YORK.

MACHINE FOR GATHERING STONES.

SPECIFICATION forming part of Letters Patent No. 349,685, dated September 28, 1886.

Application filed February 1, 1886. Serial No. 190,492. (No model.)

*To all whom it may concern:*

Be it known that I, NATHAN BOTSFORD, of Lockport, in the county of Niagara and State of New York, have invented a certain new and useful Improvement in Machines for Gathering Stones; and I do hereby declare that the following is a full, clear, and exact description of the same, reference being had to the drawings accompanying this application.

The object of my invention is to produce a machine which, when driven along over a field, will pick and load small stones, thereby saving much labor and expense.

The invention consists in the following construction and arrangement of parts.

Figure 1:
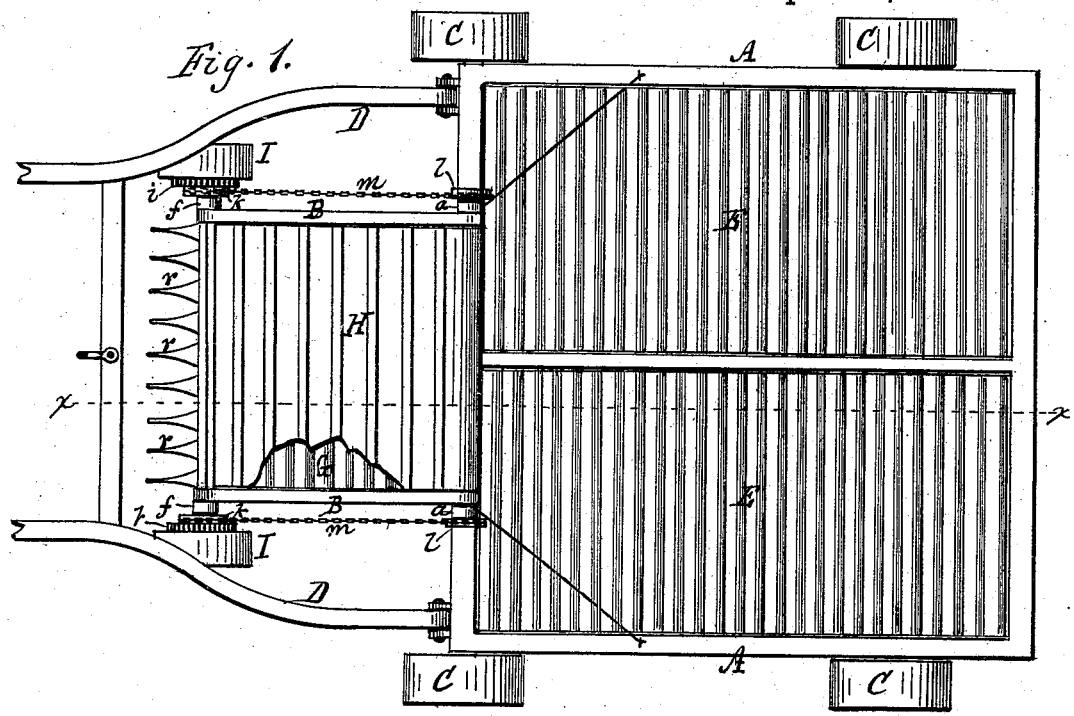
Figure 2:
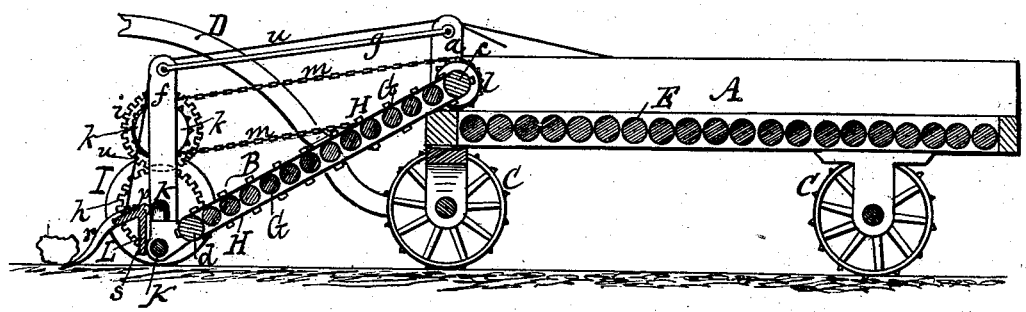
Figure 3:
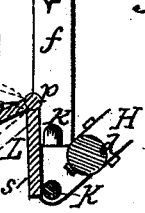

In the drawings, Figure 1 is a plan view of the machine. Fig. 2 is a longitudinal vertical section of the same in line $x$ $x$ of Fig. 1. Fig. 3 is a detail view showing the means for elevating the teeth.

The machine consists, essentially, of two platforms, A B, the first constituting the receptacle on which the stones are loaded to be drawn away, and the latter constituting the elevator by which the stones are carried up on the main platform.

The main platform A consists of a square or rectangular frame mounted on low supporting-wheels C C, and drawn by thills or a pole, D, to which may be attached a single or double team. In the bed of this platform are located two series of horizontal rollers, E E, lying close together and covering the whole surface. These rollers lie crosswise or at right angles to the direction of the machine in motion.

The elevating-platform B consists of a frame with side pieces pivoted at the rear to upright standards $a$ $a$, which rise from the front cross-piece of the main platform, by which means the elevating-platform can be raised from the ground at the front end, when desired, by any suitable arrangement of lever-work. This elevating-platform stands at an incline, as shown, so that its front end comes near to the surface of the ground.

G G are a series of cross-rollers in the bed of the elevating-platform, and H is an endless apron, passing over these rollers and around driving-rollers $c$ $d$ at the ends. The endless apron may consist of a band of leather or other flexible material, provided with cross-slats; or it may be made of lags, hinged together like the endless platform of a tread horse-power.

The stones, as they are picked up in front, are thrown over onto the endless apron and carried up and dropped onto the rollers of the main platform, where stands an operator who slides them back over the rollers of the main platform to the rear. The sides of the main platform are boxed to hold a proper load.

I I are driving traction-wheels at the front of the elevating-platform, the same turning loosely on the ends of the bent axle K. The front of the platform is attached to the bend of the axle, by which means it is brought down near to the ground and is held stiffly in place.

$f f$ are standards rising from the front corners of the elevating-platform, and stayed at their tops by rods $g$ $g$, extending to the standards $a$ $a$ of the main platform.

$h$ $h$ are spur-gear wheels attached fast to the driving-wheels I I and revolving with them.

$i$ $i$ are spur-pinions, with which the gear-wheels $h$ $h$ engage.

$k$ $k$ are sprocket-wheels fast to the pinions $i$ $i$, and $l$ $l$ are similar sprockets on the ends of the shaft of roller $c$, by which the endless apron is driven.

$m$ $m$ are drive-chains connecting the sprocket-wheels, by which motion is imparted from the driving-wheels through the medium of the gears described.

The sizes of the gear-wheels and sprocket-wheels are so proportioned that the endless apron will run fast enough to correspond with the forward motion of the machine and carry up the stone without impediment.

L is an angle-iron in front, pivoted at $p$ at the ends, and forming the bearing to the teeth or fingers $r$ $r$, that pass just below the surface of the ground and scoop up the stones. The stones pass up over the fingers, the dirt being sifted out, and drop onto the endless apron. The lower flange, $s$, of the angle-iron rests against the bent axle, which holds it stiffly in place, while the upper flange serves as the attachment for the teeth.

$u$ is a cord, chain, or other connection attached to the outer edge of the angle-iron, thence extending up over pulleys on the standards $f$ $a$ to a point where it can be seized and operated from the main platform. By drawing on this cord at any time the angle-iron will be turned upon its axis and the fingers will be elevated, as shown in dotted lines, Fig. 3, which is necessary in driving to the field, in turning corners, and sometimes in passing over obstructions. In addition to this, the whole front elevating-platform, with the parts attached, can at any time be turned up, as before described.

By the machine above described loose stones can be readily picked from the ground by the forward motion of the machine, elevated, and deposited on the rear platform, and there the work of running them back and packing them is greatly facilitated by the roller-bottom, which allows the stones to roll back easily. The main platform may be made somewhat lower at the rear than the front end, to facilitate the work.

In addition to its use as a stone-gatherer, the machine may be easily converted into a field-roller. To do this the front elevating-platform is removed entirely and a series of the wheels C C may be strung on the front axle of the main platform, or on both front and rear axles, if desired, making a continuous roller. In such case, when desired, the platform can be loaded to add extra weight.

Having described my invention, what I claim as new, and desire to secure by Letters Patent, is—

1. In a machine for gathering stones, the combination of a main platform provided with a continuous roller-bottom, an inclined elevating-platform provided with an endless apron or lags, and a set of teeth or fingers in front, which are capable of being turned up and down, as shown and described, and for the purpose specified.

2. In a machine for gathering stones, the combination of the main platform with a roller-bottom, the inclined elevating-platform provided with an endless apron or lags, the pivoted angle-iron provided with teeth or fingers, the driving-wheels at the front of the elevating-platform, the two gear-wheels, the sprocket-wheels, and the drive-chains for giving motion to the endless apron, as shown and described, and for the purpose specified.

3. In a machine for gathering stones, the combination, with the main platform provided with rollers and the elevating-platform provided with an endless apron or lags, of an angle-iron pivoted in front of the elevating-platform, teeth or fingers attached to the angle-iron, and a cord or chain connected with the angle-iron and extending back within reach of the operator on the main platform, whereby said teeth or fingers may be elevated, as set forth.

In witness whereof I have hereunto signed my name in the presence of two subscribing witnesses.

NATHAN BOTSFORD.

Witnesses:
R. F. OSGOOD,
Z. L. DAVIS.